INVENTOR
HAROLD C. LEONARD

BY Strauch, Nolan & Neale
ATTORNEYS

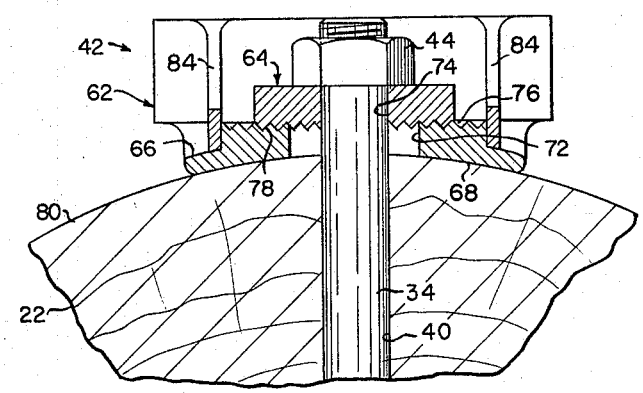
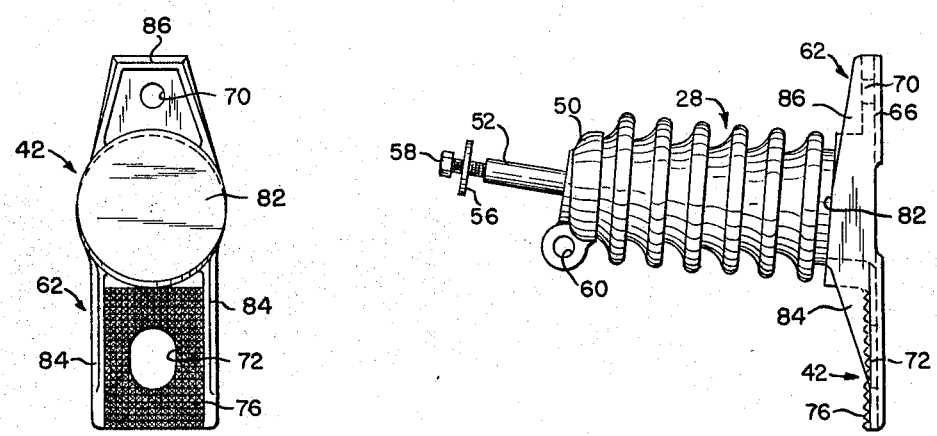

United States Patent Office 3,267,202
Patented August 16, 1966

3,267,202
ADJUSTABLE INSULATOR SUPPORT
Harold C. Leonard, Jackson, Miss., assignor to Performance Insulator, Inc., Jackson, Miss., a corporation of Mississippi
Filed Jan. 16, 1963, Ser. No. 251,846
6 Claims. (Cl. 174—45)

This invention relates to overhead, armless type electrical distribution systems in which primary conductor supporting insulators are mounted directly on utility poles in back-to-back relationship and, more specifically, to novel adjustable insulator supports for facilitating the assembly of the insulators to the utility poles in such systems.

Copending United States application Serial No. 249,813 filed January 7, 1963, by Harold C. Leonard and Vardaman K. Smith for Distribution System, now Patent 3,145,259, discloses a novel electrical distribution system in which the utility pole supported cross arms on which the primary conductors are carried in the conventional overhead system are replaced by a pair of insulators mounted directly on each utility pole in back-to-back relationship adjacent its upper end and a third insulator extending above and also fixed directly to the pole. A number of advantages are obtained from this system including a more attractive appearance, greater climbing space, increased capacity and other advantages discussed in detail in the copending application.

In the system disclosed in the copending application, the back-to-back insulators are attached to insulator supports which are disposed on opposite sides of the pole at substantially the same level and secured in place by a pair of vertically spaced apart bolts, each extending horizontally through the utility pole and both insulator supports. Nuts threaded on the bolts clamp the insulator supports against the opposite sides of the utility pole. In this arrangement, the bolt receiving apertures in the insulator supports are sized only slightly larger than the bolt diameter to prevent movement of the supports and to insure that the large magnitude loads imposed on the insulators by the weight of the primary conductors, high winds, and the like are evenly distributed between the two insulator supporting bolts.

The close tolerance between the insulator supporting bolt and the bolt receiving apertures in the insulator supports requires that the two horizontal apertures in the pole through which the bolts extend be almost precisely parallel. As a result, the construction crew must exercise an extremely high degree of care in drilling the bolt receiving apertures through the poles, significantly increasing the time required to and, therefore, the cost of, constructing such a system. This problem is aggravated when the holes must be bored in existing erected poles as in converting a conventional overhead system to the type of system disclosed in the copending application since the workmen may be working on the order of 35 feet above the ground and, at best, will have only limited freedom of movement.

If the holes, as drilled, are not parallel, they must be reamed out or redrilled to provide the necessary parallelism of the two insulator supporting bolts. In either case, damage and decay will be invited, shortening the useful life of the pole. Additionally, reaming out of a hole permits movement of the bolt extending through it and, as a result, the insulators may not be adequately supported from the pole.

It is, therefore, one object of the present invention to provide a novel adjustable insulator support which, when utilized to mount back-to-back insulators in the manner described above, will accommodate the normally encountered degree of non-parallelism of the two bolt receiving holes through the utility pole, eliminating the problems created by reaming out or redrilling the holes and speeding the construction process since it is not necessary that the holes be exactly parallel.

In its preferred embodiment the novel adjustable insulator support provided by the present invention for achieving this desired end includes a vertically extending base which mounts the insulator and which rests directly against the utility pole. One insulator supporting bolt extends through a hole only slightly larger than the bolts at the upper end of the base and the other through an aperture adjacent the lower end of the base which is both substantially longer and substantially wider than the diameter of the bolt, permitting the lower bolt to extend through the base even though it is not parallel to the upper bolt.

To transmit loads imposed on the insulator to the lower bolt and to prevent movement of the lower end of the base, a plate or washer having an aperture only slightly larger than the bolt is assembled over the free threaded end of the bolt into engagement with the base against which it is clamped by a nut threaded on the bolt. To insure that the washer does not slip relative to the base and unduly stress the lower bolt and to insure that loads imposed on the insulator are uniformly distributed between the upper and lower bolts, mating teeth are formed on the engaging surfaces of the washer and the base.

Other objects and further novel features of the present invention will become more fully apparent from the appended claims and as the ensuing detailed description and discussion proceeds in conjunction with the accompanying drawing, in which:

FIGURE 3 is a section through the adjustable insulator support, taken substantially along line 3—3 of FIGURE 2;

FIGURE 4 is a side elevation of the adjustable insulator support with an insulator attached; and FIGURE 5 is a front elevation of the adjustable insulator support as it appears with the insulator removed.

Figure 1:
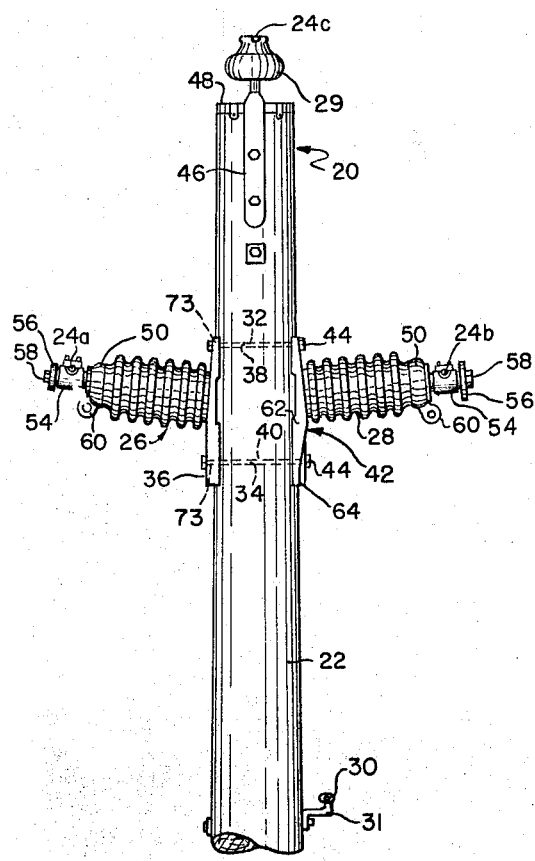
FIGURE 1 is a front elevation of an electrical distribution system pole construction employing an adjustable insulator support constructed in accordance with the principles of the present invention.
Figure 2:
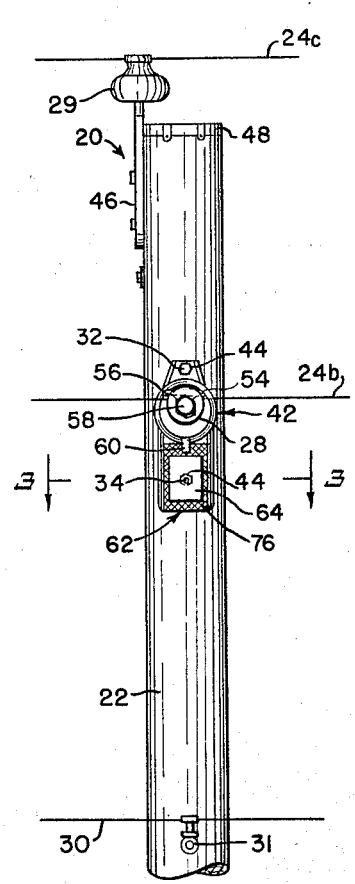
FIGURE 2 is a side elevation of the pole construction of FIGURE 1.

Referring now to the drawing, FIGURES 1 and 2 illustrate an armless overhead electrical distribution system pole construction 20 embodying the present invention. Pole construction 20 includes a utility pole 22 from which three equidistantly spaced primary conductors 24a–c are suspended by post-type insulators 26 and 28 and pin-type insulator 29, all fixed to utility pole 22 adjacent its upper end. As is explained in detail in the copending application referred to above, the three primary conductors 24a–c each carry one phase of three-phase electrical power at a distribution voltage of 2–35 kv. from a sub-station to consumer locations where the distribution voltage is lowered to a level directly usable by the consumer to whom the electrical energy is transmitted by secondary conductors formed into a cable bundle 30 which is supported from utility pole 22 by a conventional attachment 31. The details of the distribution system, which form no part of the present invention, are disclosed in the copending application to which reference may be had if deemed necessary.

Referring again to FIGURES 1 and 2, the two post-type insulators 26 and 28 by which primary conductors 24a and 24b are supported are mounted adjacent the upper end of pole 22 in back-to-back relationship by bolts 32 and 34 which extend serially through (a) the conventional, non-adjustable insulator support 36 to which insulator 26 is attached; (b) substantially parallel, vertically spaced apart holes 38 and 40 through utility pole 22; and (c) an adjustable insulator support 42 constructed in accordance with the principles of the present invention, to which insulator 28 is attached. Nuts 44, threaded on the free ends of bolts 32 and 34, clamp insulator supports 36 and 42 against opposite sides of utility pole 22. Preferably, bolts 32 and 34 should have a shear strength on the order of at least 1000 pounds to resist loads imposed upon insulators 26 and 28 by the weight of conductors 24a and 24b, high winds, and the like, and transmitted to the bolts by insulator supports 36 and 42.

The pin-type insulator 29, to which primary conductor 24c is fastened by a conventional tie wire (not shown), is supported on a bracket 46 bolted to the upper end of pole 22 and extends upwardly beyond the pole. A metal cap 48 is bolted or otherwise fixed to the top of pole 22 to prevent moisture from attacking the pole and causing deterioration.

Referring next to FIGURE 4, each of the post-type insulators 26 and 28 carries on its outer end a metal cap 50 from which a cylindrical, elongated, line clamp supporting post 52 extends. Primary conductors 24a and 24b extends through line clamps 54 (see FIGURE 1) journalled on posts 52 on which they are retained by washers 56 and cap screws 58 extending through the washers into internally threaded blind bores (not shown) in posts 52.

Each of the metal caps 50 also includes an integrally formed lifting eye 60 to facilitate the installation of insulators 26 and 28.

Referring now to FIGURES 3-5, adjustable insulator support 42 includes two components, a support base 62 and a clamping plate 64 (see FIGURES 2 and 3). Support base 62 has a main body portion indicated generally by reference character 66 the rear side 68 of which is concavely configured to provide large area contact between base 62 and utility pole 22.

As is best shown in FIGURE 5, bolt-receiving apertures 70 and 72 are formed in base body portion 66 adjacent its opposite ends to receive the insulator supporting bolts 32 and 34, respectively. The upper bolt-receiving aperture 70 is substantially equal in diameters to the insulator supporting bolts. Enlarged bolt-receiving aperture 72, in contrast, has both a length and a width substantially greater than the diameter of bolts 32 and 34. In one distribution system employing an adjustable insulator support in accordance with the present invention, for example, bolts 32 and 34 have a diameter of 1 inch and enlarged bolt-receiving aperture 72 has a width of 2 inches and a length of 2.5 inches.

The function of enlarged bolt-receiving aperture 72 can best be understood by reference to FIGURE 1. As is shown in this figure, the center-to-center distance between the two bolt-receiving apertures 73 in insulator support 36 and the center-to-center distance between the bolt-receiving apertures 70 and 72 in adjustable insulator support 42 are equal. Therefore, if the horizontal holes 38 and 40 in utility pole 22 through which bolts 32 and 34 extend are exactly parallel, both bolt-receiving apertures in adjustable support 42 could be made substantially the same diameter as bolts 32 and 34 as has been done in armless systems constructed in accordance with the principles of the copending application in which conventional non-adjustable bases were employed. However, it is difficult to drill holes 38 and 40 exactly parallel, especially in existing erected poles where the lineman may be working in lineman's hooks 35-40 feet above the ground surface. The high degree of care required to insure the necessary parallelism substantially slows construction, significantly increasing the cost of the labor required to construct an armless distribution system. In addition, if the holes 38 and 40 are not parallel as drilled, they must be reamed out or redrilled. Redrilling or reaming out of the holes may make it impossible to secure the insulator supports against movement; and, moreover, reamed out and redrilled holes will invite damage and decay, substantially shortening the service life of the utility pole 22.

In the present invention, in constrast, it is immaterial that the holes 38 and 40 through utility pole 22 through which bolts 32 and 34 extend are not precisely parallel or not exactly vertically aligned, since enlarged bolt-receiving aperture 72 will accommodate relative misalignments of the bolt ends extending through apertures 70 and 72 up to one-half inch in either lateral direction and up to three-fourth inch upwardly and downwardly. Consequently, the novel adjustable support construction provided by the present invention eliminates the necessity for drilling the holes precisely parallel, speeding and reducing the cost of constructing ar armless electrical distribution system. Additionally, the ability of adjustable insulator support 42 to accommodate misalignment of the holes through the utility pole eliminates the necessity of reaming out or redrilling these holes and, consequently, eliminates the damage and decay which such reaming out and redrilling would invite.

Clamping plate 64 is employed to prevent shifting of support base 62 and to insure that loads imposed upon insulator 28 and transmitted by adjustable base 42 to support bolts 32 and 34 in the form of shear stresses are substantially equally divided between the two supporting bolts. As is best shown in FIGURE 3, clamping plate 64 is a rectangular member having a central aperture 74 of substantially the same diameter as supporting bolt 34 which extends through the aperture. Therefore, any loads imposed upon clamping plate 64 will be transmitted to bolt 34 which, in return, restrains clamping plate 64 from lateral and vertical movement.

To transmit vertically and laterally acting loads from base 62 to clamping plate 64 and to prevent base 62 from moving relative to clamping plate 64, mating, diamond shaped teeth 76 and 78 are formed on the opposite surfaces of base 62 and clamping plate 64, respectively. In one embodiment, both the teeth 76 on base 62 and the teeth 78 on clamping plate 64 have bases 1/4 inch square and a depth of 1/8 inch.

As is best shown in FIGURE 3, the nut 44 threaded on the free end of bolt 34 presses clamping plate 64 into engagement with base 62, firmly interlocking the diamond shaped teeth 76 and 78 on the base and clamping plate, respectively.

Since the clamping plate and base are mechanically interlocked by teeth 76 and 78, relative movement of base 62 and clamping plate 64 is precluded. And, as movement of clamping plate 64 is precluded by bolt 34 and bolt 34 is immobilized by pole 22, base 62 is precluded from moving laterally or vertically relative to the pole. Twisting movement of base 62 relative to clamping plate 64 is also precluded by the mechanically interlocking teeth 76 and 78. Rotary movement of base 62 and clamping plate 64 as a unit about bolt 34 relative to pole 22 is effectively prevented by the matching concave rear surface 68 of base 62 and convex surface 80 of pole 22.

It will be apparent that, as clamping plate 64 cannot move relative to base 62 in either a lateral or vertical direction, vertical or laterally directed forces imposed upon base 62 will be transmitted through clamping plate 64 to bolts 34. Substantially the same result is achieved at the upper end of base 62 since supporting bolt 32 and bolt-receiving aperture 70 in base 62 have substantially the same diameter. Therefore, laterally and vertically acting loads imposed upon insulator 28 will be substantially equally distributed between supporting bolts 32 and 34.

The remaining details of adjustable support 42 are not important to the practice of the present invention and may be varied as desired. Thus, the illustrated support base 62 is provided with a circular, integral, upwardly inclined insulator mounting pad 82, integral base strengthening and rigidifying ribs 84 extending downwardly from pad 82 on opposite sides of base main body portion 66, and a trapezoidally sectioned rib 86 provided for a similar purpose extending around the periphery of the upper part of the base body portion. These and other similar details may be varied as desired.

Other modifications may also be made in adjustable insulator support 42 without exceeding the scope of the present invention in its broadest aspects. For example, ridges and grooves may be substituted for the diamond shaped teeth 76 and 78 employed in the preferred embodiment to mechanically interlock base 62 and clamping plate 64. Or, in some applications, mere roughening of the opposite surfaces of base 62 and clamping plate 64, as by sand blasting or the like, may provide a satisfactory mechanical interlock. As a further modification, a cooperating base plate and clamping plate having smooth opposite surfaces may be employed. In this event, pole engaging projections would preferably be formed on the rear surface 68 of base 62 to prevent movement of the base relative to the pole. As a still further modification, the relative position of base main body portion 66 and clamping plate 64 may be transposed so that clamping plate 64 is disposed between base 62 and pole 22. Again, in some applications, movement of base 62 relative to pole 22 may be precluded by fixing the base to the pole with a suitable adhesive in which case a mechanical interlock between the base and the clamping plate is not necessary.

It will be obvious that the present invention is not limited to the particular illustrated configuration of post-type insulators but may be employed with post-type insulators of widely varying configuration. Also, the present invention is not limited in applicability to the armless distribution system described above, but may be utilized in any circumstance where an adjustable insulator can be advantageously employed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a pole construction for an armless overhead electrical distribution system including:
   (a) a utility pole;
   (b) insulator supports on opposite sides of said pole mounting a pair of primary conductor suspending insulators in back-to-back relationship adjacent the upper end of said pole; and
   (c) a pair of vertically spaced apart bolts supporting said insulator supports from said poles, each of said bolts extending substantially through said pole and both of said supports; the improvement wherein:
   (d) at least one of said insulator supports comprises a support base with an enlarged bolt receiving aperture substantially longer and wider than the diameter of said bolts formed therein whereby said bolts may be inserted through said pole and said supports even though the bolt-receiving holes through said pole are not parallel; and wherein
   (e) said one insulator support includes clamping means for preventing movement of said one support relative to said bolts after said one support is fixed to said pole and for transmitting forces having horizontal and vertical components and exerted on said one support in directions normal to said bolts through the bolt extending through said enlarged aperture to said pole, said clamping means including a plate juxtaposed to said base and having an aperture therein substantially equal in diameter to said bolts and surrounding the bolt extending through the enlarged bolt-receiving aperture in said base and means for mechanically interlocking said base and said plates to prevent said plate from sliding relative to said base in any direction normal to said bolt.

2. The pole construction as defined in claim 1, wherein the last-named means comprises mating teeth on the juxtaposed surfaces of said plate and said base.

3. The pole construction as defined in claim 2, wherein said base is disposed between said pole and said plate.

4. The pole construction as defined in claim 2, wherein said teeth are diamond shaped.

5. The pole construction as defined in claim 1, including an integral insulator mounting pad formed on said base between said bolt-receiving apertures.

6. The pole construction as defined in claim 5, together with an insulator mounted on said insulator mounting pad and extending at substantially right angles to said base.

References Cited by the Examiner

UNITED STATES PATENTS

| | | | |
|---|---|---|---|
| D. 194,357 | 1/1963 | Lantz | 174—174 X |
| 1,184,336 | 5/1916 | Fay | 248—221 X |
| 1,271,596 | 7/1918 | Mayer | 174—161 |
| 2,049,893 | 8/1936 | Chicoine | 248—221 |
| 2,751,175 | 6/1956 | Jones | 248—72 |
| 2,969,859 | 1/1961 | Huggins | 180—33 |

FOREIGN PATENTS 355,906   9/1931   Great Britain.

OTHER REFERENCES

Saddock: "Horizontal Insulators Squeeze 115-kv. Feeder Into 40-ft. R/W," Electrical World, Sept. 25, 1961, pages 42–45.

LARAMIE E. ASKIN, *Primary Examiner.*

JOHN P. WILDMAN, *Examiner.*